No. 683,381. Patented Sept. 24, 1901.
A. CHAMBERLIN.
BICYCLE.
(Application filed Mar. 11, 1901.)
(No Model.)
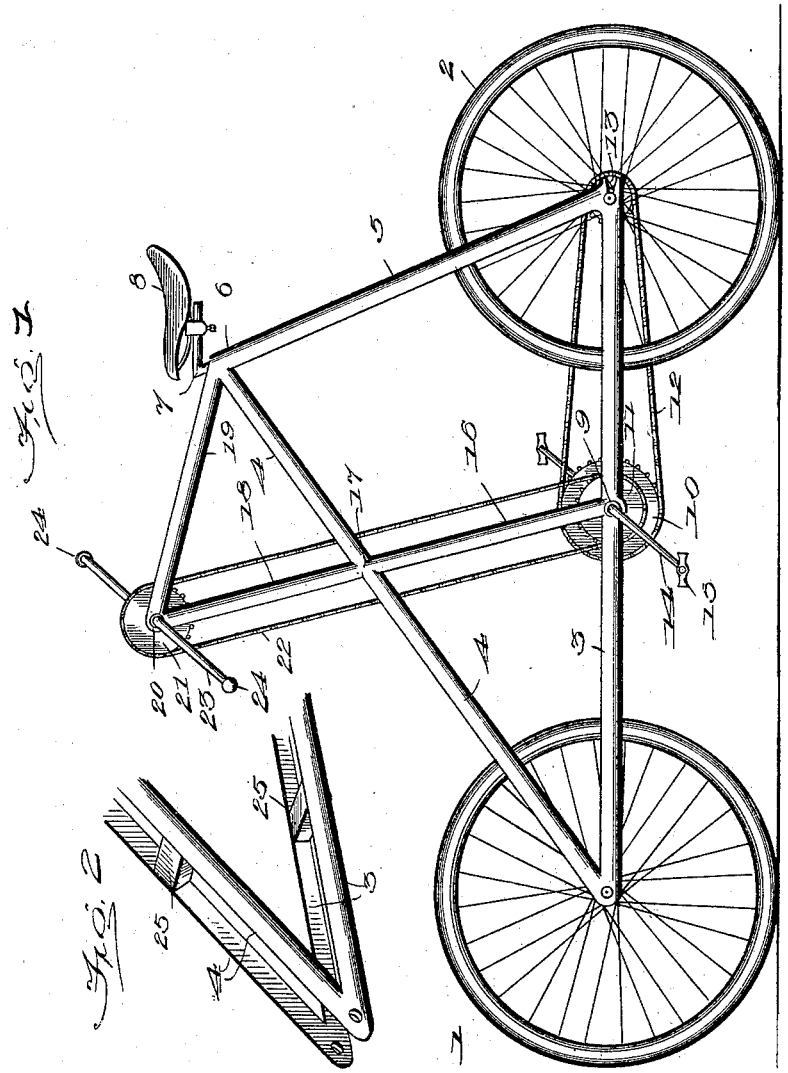
Inventor
Altia Chamberlin
By Victor J. Evans
Attorney
Witnesses

UNITED STATES PATENT OFFICE.

ALTIA CHAMBERLIN, OF FAIRBURY, NEBRASKA.

BICYCLE.

SPECIFICATION forming part of Letters Patent No. 683,381, dated September 24, 1901.

Application filed March 11, 1901. Serial No. 50,644. (No model.)

*To all whom it may concern:*

Be it known that I, ALTIA CHAMBERLIN, a citizen of the United States, residing at Fairbury, in the county of Jefferson and State of Nebraska, have invented new and useful Improvements in Bicycles, of which the following is a specification.

This invention relates to bicycles, and has special reference to the construction and formation of the bicycle-frame whereby in addition to the ordinary foot-power driving mechanism the frame is adapted to form a support for auxiliary hand-power driving mechanism. The operating-shafts of the two driving mechanisms are so arranged relatively to each other and the cranks are so relatively disposed that the power of the legs may be augmented by the power of the arms, the operator being enabled to exert an upward pull of the arms simultaneously with a downward push by the legs. In addition to these advantages the frame is of a triangular shape, giving the greatest possible strength combined with lightness, and the main frame is provided with an auxiliary upwardly-extending frame for the support of the hand-shaft, which upper frame is also triangular in form. The detailed objects and advantages of the invention will appear in the course of the ensuing description.

The invention consists in a bicycle embodying certain novel features and details of construction and arrangement of parts, as hereinafter fully described, illustrated in the drawings, and incorporated in the claims.

In the drawings, Figure 1 is a side elevation of a bicycle constructed in accordance with the present invention. Fig. 2 is a detail perspective view of a portion of the frame, showing the double frame-bar construction.

Similar numerals of reference designate corresponding parts in both views.

Referring to the drawings, 1 and 2 designate the front and rear wheels of the machine, which are mounted in and connected by a frame comprising a bottom run 3, extending in a direct line between the axles of the wheels 1 and 2 and having connected to its opposite extremities the main reach-bar 4 and the rear brace 5, the said reach-bar and rear brace converging upwardly and being united at the point 6, where provision is made for the reception and clamping of a saddle-post 7, to which a saddle 8, of any construction, may be applied. The apex of the triangle formed by the bars 3, 4, and 5 is arranged nearer the rear wheel than the front wheel by making the main reach-bar 4 of greater length than the rear brace 5. This brings the saddle more nearly over the rear driving-wheel 2.

The bottom run 3 is provided with bearings for the reception of the pedal-shaft 9, carrying the main driving sprocket-wheel 10 and a small sprocket-wheel 11. A foot-power chain 12 passes around the larger sprocket-wheel 10 and also around the sprocket-pinion 13 on the hub of the driving-wheel 2, thus providing for driving the machine with the ordinary foot propelling devices, the shaft 9 having the usual cranks 14 and pedals 15.

16 designates a central strut which extends from the bottom run at a point adjacent to the crank-axle, bearing upward, intersecting with the main reach-bar at the point 17, and extending in a straight line upward beyond the reach-bar 4 to form one of the bars 18 of a top extension-frame of triangular shape, the base of the triangle being formed by a portion of the main reach-bar 4 and the remaining side of the triangle, consisting of a top run 19, which extends from the apex of the main frame forward to the upper extremity of the central strut 16. The apex of the extension-frame is provided with bearings for the reception of a hand-shaft 20, upon which is mounted a sprocket-wheel 21, which drives a chain 22, extending downward and passing around the small sprocket-wheel 11 of the pedal-shaft. The hand-shaft 20 is provided with cranks 23 and crank-handles 24, by means of which it may be operated.

The sprocket-wheels 11 and 21 are of the same size and have the same number of teeth, and therefore revolve in unison, and the cranks of the hand and pedal shafts are so arranged with respect to each other that as the foot is depressed at one side of the machine the hand at the opposite side of the machine is drawn upward, thus enabling the rider to utilize a maximum amount of power in driving the machine up a hill or steep incline.

The frame as a whole is composed of twin side members, as illustrated in the detail view, Fig. 2, in which portions only of the bottom run 3 and main reach-bar 4 have been illustrated; but it will be understood that the entire frame is constructed in such manner, all of the frame-bars comprising parallel members, which are joined rigidly together at suitable points by means of tie-braces 25. This construction provides for the reception of the driving-wheels between the twin side members of the frame, and also allows the driving mechanism to be arranged between the twin members, so that said members serve to inclose and form guards for all the operative or moving parts of the machine and driving mechanism.

The steering of the machine is effected by a leaning motion of the body of the rider. This is made possible by the fact that nearly the entire weight of the rider is borne by the rear wheel, thus giving the rear wheel power to sway the front wheel to either side.

Having thus fully described my invention, what I claim as new, and desire to secure by Letters Patent, is—

1. In a bicycle, a frame comprising a bottom run extending in a direct line with the wheel-axles, a main reach-bar and rear braces respectively connected with opposite ends of the bottom run and united at their upper extremities to form a triangular main frame, and an upper triangular extension-frame, the base of which is formed by a portion of the reach-bar.

2. In a bicycle, a frame comprising a bottom run extending in a direct line with the wheel-axles, a main reach-bar and rear braces respectively connected with opposite ends of the bottom run and united at their upper extremities to form a triangular main frame, a center strut connecting the bottom run and reach-bar and extending above the latter, and a top run connecting the apex of the main frame and the upper extremitity of the strut.

In testimony whereof I affix my signature in presence of two witnesses.

ALTIA CHAMBERLIN.

Witnesses:
   W. P. STEBBINS,
   J. W. WARD.